H. M. SINCLAIR.
FEATHER-RENOVATORS.

No. 193,835.                Patented Aug. 7, 1877.

Witnesses.                    Inventor.

UNITED STATES PATENT OFFICE.

HENRY M. SINCLAIR, OF BELLEVUE, OHIO.

IMPROVEMENT IN FEATHER-RENOVATORS.

Specification forming part of Letters Patent No. 193,835, dated August 7, 1877; application filed May 26, 1877.

*To all whom it may concern:*

Be it known that I, HENRY M. SINCLAIR, of Bellevue, in the county of Huron and State of Ohio, have invented a certain new and Improved Feather-Renovator; and I do hereby declare that the following is a full, clear, and complete description thereof, reference being had to the accompanying drawings, making a part of the same.

Figure 1:
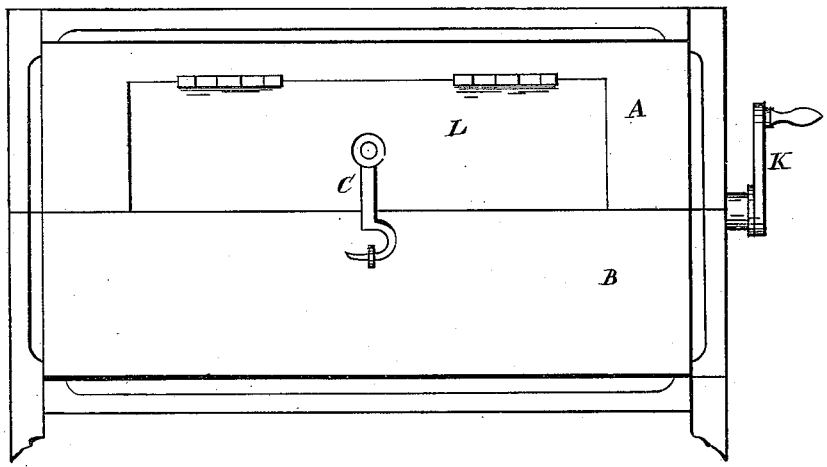
Figure 2:
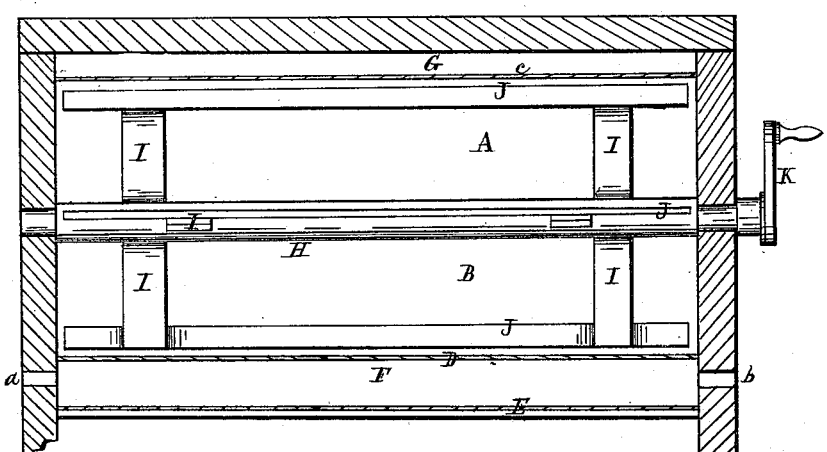
Figure 3:
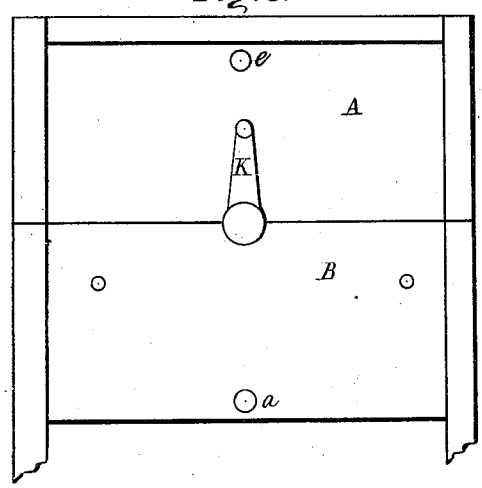
Figure 4:
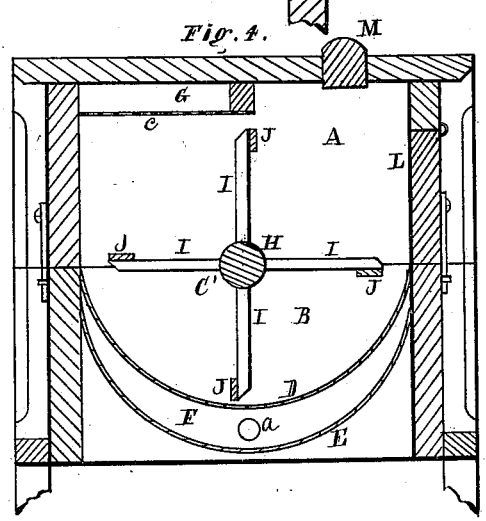

Figure 1 is a side elevation of the renovator. Fig. 2 is a vertical longitudinal section. Fig. 3 is an end view. Fig. 4 is a transverse section.

Like letters of reference refer to like parts in the several views.

This invention relates to an apparatus for cleaning and renovating feathers, and consists in certain details of construction, which will be fully described, and then pointed out in the claim.

The apparatus is provided with a perforated chamber arranged in the top of the renovating-chamber, charged with steam from an upper pipe, and from which it issues through perforations into the renovating-chamber for scalding and cleaning the feathers. The steam for this purpose is inducted into the chamber, and evenly distributed therein throughout its entire length. The renovating-chamber is also provided with a door for the reception of the feathers to be cleaned, and for discharging the same when renovated.

A more full and complete description of the apparatus is as follows:

The renovating-chamber alluded to is constructed in two sections, A and B, which are connected to each other by hooks C. Section B is provided with two bottoms, D and E, Figs. 2 and 4, between which is formed a steam space or chamber, F, which communicates with the outside by ports *a b*.

In the roof of the upper section A of the renovating-chamber is formed a steam-chamber, G, Fig. 4, extending the entire length of the section, as seen in Fig. 2. The bottom *c* of said steam-chamber is of perforated metal, through which steam passes therefrom into the renovating-chamber for treating the feathers.

The agitator C' of the apparatus consists of a shaft, H, projecting from which are arms I. To said arms are secured rails J, for stirring the feathers, and the agitator is operated from the outside by a handle, K. Access is had to the inside of the renovating-chamber through a door, L, Fig. 1.

The practical operation of the above-described apparatus is as follows: The feathers are introduced into the apparatus through the door L. A steam-generator is placed near the apparatus, from which steam is taken, and inducted into the renovating-chamber by having it first pass through the steam-chamber G through the port *e*, Fig. 3. Through the perforated bottom *e* of the chamber G the steam is disseminated in jets into and among the feathers, which are stirred up by the agitator throughout the entire length of the chamber in an even and uniform manner, so that the agitated feathers are thereby uniformly and equally exposed to the scalding and renovating action of the steam from one end of the chamber to the other.

The feathers being sufficiently treated by the direct action of the steam, said steam is then turned off, and the now damp feathers dried by means of the chamber F, (forming the bottom of the apparatus,) into which the steam is now inducted through the opening *a*. The feathers are dried by the steam in the heated bottom, and are at the same time stirred up by the agitator, so that all of them may be exposed equally to the drying influence of the steam-heated bottom D.

The moisture from the drying feathers escapes from the apparatus through openings made in the top of section A, which, while the feathers are being steamed, are closed by a stopple, M, Fig. 4, but opened for the escape of moisture, &c., while the feathers are being dried, which, when this is accomplished, are removed from the renovating-chamber through the door L by the action of the agitator, which expels them therefrom by the bars J and the current of air induced by the revolution of the same.

What I claim as my invention, and desire to secure by Letters Patent, is—

The combination of upper section A, having vapor-opening provided with plug M, and steam-chamber G, provided with steam-inlet e and foraminous plate c, the lower section B, having close drying-chamber F, provided with steam inlet and outlet, and the rotary agitator, consisting of crank-shaft H, pivoted between the two sections, and having arms I and beaters J, the whole adapted to operate substantially as and for the purpose set forth.

HENRY M. SINCLAIR.

Witnesses:
W. H. BURRIDGE,
W. K. KIDD.